United States Patent
Schemmann et al.

(10) Patent No.: US 8,442,082 B2
(45) Date of Patent: May 14, 2013

(54) LASER CONTROLLER

(75) Inventors: Marcel Franz Christian Schemmann, Maria Hoop (NL); Aalbert Stek, Emmen (NL); Carsten Heinks, Eindhoven (NL); Pieter Hoeven, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 115 days.

(21) Appl. No.: 12/444,050

(22) PCT Filed: Oct. 3, 2006

(86) PCT No.: PCT/IB2006/053605
§ 371 (c)(1),
(2), (4) Date: Apr. 2, 2009

(87) PCT Pub. No.: WO2008/041056
PCT Pub. Date: Apr. 10, 2008

(65) Prior Publication Data
US 2010/0098119 A1    Apr. 22, 2010

(51) Int. Cl.
*H01S 3/13*    (2006.01)
(52) U.S. Cl.
USPC ................................................ 372/29.021
(58) Field of Classification Search ............ 372/29.011, 372/29.016, 25; 345/159
See application file for complete search history.

(56) References Cited

U.S. PATENT DOCUMENTS

| | | | |
|---|---|---|---|
| 5,059,760 A * | 10/1991 | Iehisa et al. | 219/121.83 |
| 5,202,892 A * | 4/1993 | Harwick | 372/30 |
| 5,262,636 A | 11/1993 | Rink | |
| 5,272,716 A * | 12/1993 | Soltz et al. | 372/109 |
| 5,745,437 A | 4/1998 | Wachter et al. | |
| 5,889,490 A * | 3/1999 | Wachter et al. | 342/127 |
| 5,930,277 A | 7/1999 | Shih | |
| 5,982,789 A | 11/1999 | Marshall et al. | |
| 5,982,795 A * | 11/1999 | Rothweil et al. | 372/38.04 |
| 6,219,165 B1 | 4/2001 | Ota et al. | |
| 6,389,050 B2 | 5/2002 | Stronczer | |
| 6,516,010 B1 * | 2/2003 | Broutin et al. | 372/29.01 |
| 6,671,638 B2 | 12/2003 | Kitazumi et al. | |

(Continued)

FOREIGN PATENT DOCUMENTS

| | | |
|---|---|---|
| JP | 06-137869 | 5/1994 |
| JP | 08-029202 | 2/1996 |

(Continued)

OTHER PUBLICATIONS

M. Liess et al., "A Miniaturized Multidirectional Optical Motion Sensor and Input Device Based on Laser Self-Mixing", Institute of Physics Publishing, Measurement Science and Technology, 13, (2002), pp. 2001-2006.

*Primary Examiner* — Jessica Stultz
*Assistant Examiner* — Tuan Nguyen

(57) ABSTRACT

A controller for controlling the power of a laser that is used in determining the motion of an object includes a power source that is arranged to supply power pulses to the laser in response to a controller signal. The controller controls the generation of pulses during periods in which a reliable result can be obtained, by detecting the laser radiation that has interacted with pulses reflected from the object, in order to conserve power consumption. Further the power pulses include a heating pulse portion, which serves to stabilize the temperature of the laser and calibrate the laser so that a known lasing wavelength is generated.

15 Claims, 1 Drawing Sheet

U.S. PATENT DOCUMENTS

| | | |
|---|---|---|
| 6,703,599 B1 | 3/2004 | Casebolt et al. |
| 6,707,027 B2 | 3/2004 | Liess et al. |
| 6,788,724 B2 * | 9/2004 | Sell et al. .................. 372/92 |
| 6,829,043 B2 | 12/2004 | Lewis et al. |
| 6,872,931 B2 | 3/2005 | Liess et al. |
| 7,202,941 B2 * | 4/2007 | Munro .................. 356/5.01 |
| 2004/0135992 A1 | 7/2004 | Munro |
| 2005/0134556 A1 | 6/2005 | Van Wiggeren et al. |

FOREIGN PATENT DOCUMENTS

| | | |
|---|---|---|
| JP | 11201722 | 7/1999 |
| WO | WO0237410 | 5/2002 |
| WO | WO0237411 | 5/2002 |
| WO | WO200237124 | 5/2002 |
| WO | WO03010275 | 2/2003 |
| WO | WO03102751 | 12/2003 |

* cited by examiner

LASER CONTROLLER

The present invention relates to a controller for a laser and particularly but not exclusively to a controller for a laser which controls the power supplied to the laser.

Many industrial and technological disciplines require a rapid, precise measurement of distance and/or velocity of a target object. These disciplines include mapping the path of storms for predicting the weather, police speed cameras and RadioDirection and Ranging or RADAR, which is used by the military to warn of an enemy approach. However, there is also a requirement for the measurement of relative distance and movement on a much smaller scale. Many mobile phones and computer input devices, including optical mouses and "track-pads" (which operate in reverse to a mouse), rely on the ability to accurately determine the motion of the input device in order to reliably operate the system. In the case of a track-pad, an optical device is stationary and typically housed within a computer. The input device is then controlled by moving a finger over a transparent window of the housing of the input device. In this case, the optical device is very small because the optical module for measuring the finger movement can be made small. However, as the scale of the optical device is reduced, there becomes a more stringent requirement for accurate measurements and for minimizing power consumption.

The probing signal generated by the input device, which typically comprises a diode laser having a laser cavity, is focused on an object, such as a finger, by a lens. This signal is subsequently reflected off the object and is entrained back within the diode laser cavity by the lens. This induces a variation in the gain of the diode laser and thus in the signal emitted.

If there is relative movement between the diode laser and the object, the component of that movement in the direction of the measuring laser beam will cause the reflected signal to undergo a frequency change because of the Doppler effect. This reflected signal will interfere with the signal within the laser cavity and give rise to changes in various parameters including the output power, frequency, laser line width and the threshold gain. The result of the interference is a fluctuation of the values of these parameters with a frequency that is equal to the difference between the transmitted and reflected frequencies, also known as the beat frequency.

This beat frequency is proportional to the velocity of the object relative to the diode laser and thus by integrating over time, the displacement of the object can be determined assuming the wavelength of the laser light is accurately known. Furthermore, by including two probing signals arranged about the object, the motion of the object can be traced in more than one dimension.

It is known that various factors, including light scattering off impurities, airborne particulates, vibration and temperature, can influence the operation of optical systems. The present invention is concerned with the effect of temperature on the measuring device and is based on the principle that a variation of the laser temperature can affect the measuring signal.

The wavelength of the diode laser is known to be dependent on the temperature of the diode laser, for example, a temperature change of 1° C. causes a wavelength change of approximately 0.1 nm. When the diode laser is turned on then, during the warming-up of the diode laser, the wavelength of the laser radiation will change and this change causes a frequency modulation. This previously unidentified movement-independent frequency modulation will be different for the rising and falling slopes of a laser current drive and therefore, will affect the measuring signal. Such a frequency modulation can be avoided by continuously keeping the laser on, however in low power applications this is not desirable and the laser needs to be turned on only when required.

It is an object of the present invention to provide a system, which allows operation of the laser at a reduced power consumption so that a battery can be used for a substantially longer time without recharge or replacement. This aspect of the invention is based on the insight that the electronic circuitry for processing the detector signal allows the measurement of the amplitude of the signal and that, if this amplitude has exceeded a threshold level, no more current pulses are needed for the cycle. Equally, if during the first few pulses it is clear that the signal strength is very poor (due to speckle for example), the generation of the pulses is stopped because a very long measurement time is expected. In this manner, the measurement is performed in a number of measurement cycles such that the number of cycles and the number of current pulses can be varied in accordance with the signal strength. It is a further object of the invention to reliably and accurately measure movement of an object relative to a measuring device, in conditions in which the temperature varies.

In accordance with the present invention as seen from a first aspect, there is provided a controller for controlling a laser for irradiating an object with laser light, said controller comprising a power source arranged to supply power pulses to said laser, wherein said controller inhibits one or more power pulses in dependence upon detected laser light reflected from the object.

Preferably, said controller inhibits said one or more power pulses in dependence upon the power of a signal generated by an interaction between the reflected light and light emitted by the laser.

Preferably, said interaction occurs within a cavity of said laser.

Preferably, said controller inhibits said one or more power pulses if the power of the signal is below a first threshold value or above a second threshold value.

Preferably, said power pulses comprise a heating component for stabilizing the temperature of said laser.

Preferably, said at least one power pulse comprises a component for causing the laser to generate lasing radiation.

Preferably, said heating component is controlled by a controller signal, which is programmable, to control the amplitude and duration of said heating component.

Preferably, said laser is supplied with a plurality of power pulses interspersed with power-less intervals.

Preferably, said controller can determine the velocity and/or displacement of an object relative to said laser.

Preferably, said laser is arranged to generate at least one lasing wavelength.

Preferably, said controller measures a plurality of values of a parameter of the detected laser light and inhibits one or more power pulses if a correlation of the parameter values of the detected laser light allows for the prediction of at least one further value of said parameter.

In accordance with this invention as seen from a second aspect, there is provided a method of controlling a laser, said method comprising supplying power pulses to said laser for said laser to irradiate an object with laser light, detecting laser light reflected from the object and inhibiting one or more power pulses in dependence upon the detected laser light reflected from the object.

Preferably, said power pulses comprise a heating component to stabilize the temperature of the laser.

Preferably, said power pulses comprise a component which causes the laser to generate lasing radiation and wherein said temperature stabilization ensures that a pre-determined wavelength is emitted from said laser.

Preferably, said controller measures a plurality of values of a parameter of the detected laser light and inhibits one or more power pulses if the correlation of the parameter values of the detected laser light allows for a prediction of at least one further value of said parameter.

Preferably, said laser light reflected from said object undergoes self-mixing with the laser light incident upon said object.

These and other aspects of the invention will be apparent from and elucidated with reference to the embodiments described hereinafter, together with the accompanying drawings, in which.

Figure 1:
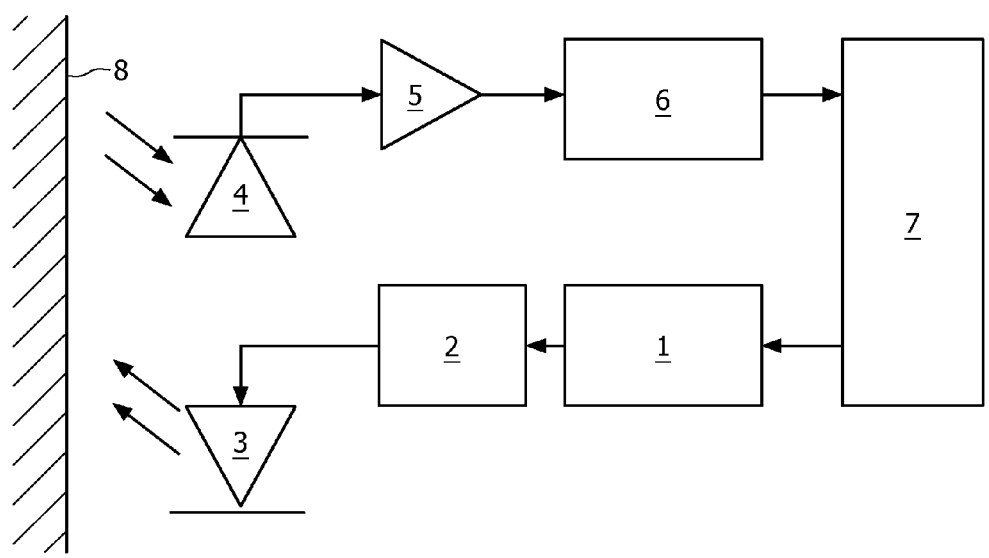
FIG. 1 is a schematic system representation of the controller system.
Figure 2:
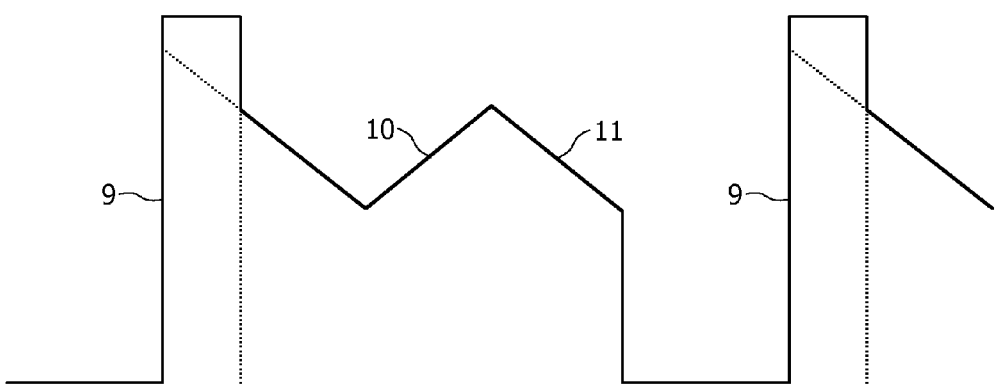
FIG. 2 is a pulse timing diagram.

Referring to FIG. 1, a controller 7 generates a signal which causes a pulse generator 1 to start a pulse sequence as shown in FIG. 2. The pulse sequence is converted into a corresponding current sequence by a current source 2 and this current sequence is then passed to a diode laser 3, which typically comprises a vertical cavity surface emitting laser or VCSEL. This current sequence causes the diode laser 3 to produce a corresponding periodic variation in optical output due to the inherent periodic heating of the diode laser 3 by the supplied current. As the temperature of the diode laser 3 increases, so will the wavelength of the emitted laser light.

A periodically varying current through the diode laser 3 results in a number of signal pulses per half period and thus in a corresponding number of pulses in the measured signal. If there is no relative movement between an object 8 and the diode laser 3, the number of signal pulses is the same in each half period. If the object 8 and the diode laser 3 move relative to each other, the number of pulses in the first half period will differ from the number in the second half period depending on the direction of movement. Furthermore, by comparing the signal measured during the second half period to the signal measured in the first half period, the direction of movement can be determined also.

However, the rising slope of the laser drive current will induce a movement-independent frequency modulation of the probing signal, which will be different from that during the falling slope and is due to the inherent heating of the diode laser 3 by the drive current. Thus, before the measurement sequence is initiated, the pulse generator 1 is arranged to generate a pre-heat segment, which is commenced with a heat pulse 9. The controller 7 is programmable to control the height and width of the heat pulse 9, and thus to ensure that the temperature of the diode laser 3 at the start of the measurement sequence is stabilized for accurate operation.

After the pre-heat segment has been applied, the diode laser 3 is supplied with a periodically varying current having a rising slope 10 and a falling slope 11 to allow determination of the direction of relative movement between the input device, i.e. the diode laser 3 and the object 8. During the first half period of the driving laser current, the wavelength of the generated laser signal increases. In the case of a relative movement away from the measuring device, the wavelength of the signal re-entering the laser cavity will increase, so that the difference between the frequency of the signal within the laser cavity and that, which re-enters the laser cavity following a reflection from the object 8, is lower than when there is no relative movement. Thus, the associated beat frequency is lower than when there is no relative movement.

During the second half period of the driving laser current, wherein the laser temperature and wavelength of the generated signal decrease, the associated beat frequency will increase for relative movement away from the diode laser 3.

Thus, for a relative movement of the object 8 away from the diode laser 3, the beat frequency in the first half period will be less than that of the second half period. Conversely, for relative movement of the object 8 towards the diode laser 3, the beat frequency in the first half period will be greater than that of the second half period. Thus, by measuring this beat frequency, the velocity of the object 8 and thus the displacement relative to the diode laser 3 can be determined. Moreover, the presetting of the laser temperature ensures that the wavelength of the signal emitted by the diode laser 3 and thus the calculated velocities and displacements, are accurately known.

The supply of current pulses to the diode laser 3 interspersed with current-less intervals, in contrast to the continuous supply of pulses, is found to reduce the power consumption of the diode laser 3, resulting in a longer battery life without recharge or replacement.

Referring to FIG. 1, the laser pulses incident upon the object are interacted with pulses reflected from the target object 8 within the laser cavity, in a process known as self-mixing. The self-mixed signal is measured using a photodiode 4, amplified with an amplifier 5 and then filtered using a filter 6. The controller 7 then calculates the power of the signal and the corresponding standard deviation. If the standard deviation of the results is very small, then the correlation between these measurements can be used to predict the next result. Extrapolating measurements in this manner reduces the number of transmitted laser pulses that are required to monitor the object and thus, reduces the power consumption of the diode laser 3.

However, if the power from the first set of pulses in the cycle is below a first threshold value, the cycle will be aborted because of the very long expected measurement time to collect sufficient power. The controller 7 then initiates a new cycle in due time. If the power from the first set of pulses is above a second threshold value then the subsequent pulses can be aborted because sufficient power has already been collected.

Additionally, the laser power reflected from the object 8 will vary according to its position due to speckle variation and this power variation can be used as an alternative in determining displacement activity, without actually determining an accurate displacement value.

This selective operation of the diode laser 3 in circumstances only when its operation will produce a reliable result, ensures that the diode laser 3 does not unnecessarily consume battery power. This process optimizes power consumption and provides for a more power efficient device.

It should be noted that the above-mentioned embodiments illustrate rather than limit the invention and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A control system for controlling a laser for irradiating an object with laser light to determine velocity and/or displacement of the object relative to said laser and for operating the laser at a reduced power consumption, said control system comprising:
   a power source arranged to supply power pulses to said laser for emitting incident radiation for incidence on the object; and
   a controller connected to the power source, wherein said controller is programmed to determine the velocity and/or the displacement of the object based on reflected laser light reflected from the object in response to the incident radiation, and to provide the reduce power consumption by controlling the power source to automatically stop the supply of the power pulses in dependence upon a power of a signal generated by an interaction between the reflected laser light and the incident radiation, wherein the reflected laser light comprises laser light reflected from the object in response to the incident radiation, and wherein said controller automatically stops the supply of the power pulses if the power of the signal is below a first threshold value or above a second threshold value.

2. The control system of claim 1, wherein said interaction occurs within a cavity of said laser.

3. The control system of claim 1, wherein said power pulses comprise a heating component for stabilizing temperature of said laser.

4. The control system of claim 3, wherein said heating component is controlled by the controller which is programmable to control an amplitude and a duration of said heating component.

5. The control system of claim 1, wherein said power pulses comprise a component for causing the laser to generate radiation.

6. The control system of claim 1, wherein said laser is supplied with a plurality of power pulses interspersed with power-less intervals.

7. The control system of claim 1, wherein said laser is arranged to generate at least one lasing wavelength.

8. The control system of claim 1, wherein said controller measures a plurality of values of a parameter of the detected laser light and inhibits one or more power pulses if a correlation of the parameter values of the detected laser light allows for a prediction of at least one further value of said parameter.

9. The control system of claim 1, wherein the controller calculates power of the reflected light and a corresponding standard deviation, and if the standard deviation is below a predetermined level then the controller uses a correlation between powers of reflected lights to predict a power of a next light reflected from the object.

10. A method of controlling a laser for irradiating an object with laser light to determine velocity and/or displacement of the object relative to said laser an for operating the laser at a reduced power consumption, said method comprising the acts of:
   supplying power pulses from a power source to said laser for said laser to irradiate the object with incident laser light;
   detecting laser light reflected from the object in response to the incident laser light; and
   determining the velocity and/or displacement of the object based on reflected laser light reflected from the object in response to the incident laser light and providing the reduced power consumption by stopping one or more of the power pulses, wherein the determining act is performed by a controller programmed to automatically initiate the stopping based on a power of a signal generated by an interaction between the reflected laser light and the incident laser light, wherein the reflected laser light comprises laser light reflected from the object in response to the incident laser light, and wherein said controller automatically stops the supply of the power pulses if the power of the signal is below a first threshold value or above a second threshold value.

11. The method of controlling a laser, as claimed in claim 10, wherein said power pulses comprise a heating pulse having an amplitude and a duration configured for heating the laser to stabilize the temperature of the laser.

12. The method of controlling a laser as claimed in claim 11, wherein said power pulses further comprise a lasing pulse having a rising slope followed by a falling slope which causes the laser to generate lasing radiation and wherein said heating pulse ensures that a predetermined wavelength is emitted from said laser in response to the lasing pulse.

13. The method controlling a laser, as claimed in claim 10, further comprising the acts of:
   measuring by the controller a plurality of values of a parameter of the detected laser light; and
   inhibiting by the controller the one or more power pulses if a correlation of the parameter values of the detected laser light allows for a prediction of at least one further value of said parameter.

14. The method according to claim 10, wherein laser light reflected from said object undergoes self-mixing with the laser light incident upon said object.

15. The method of claim 10, further comprising the act of calculating by the controller power of the reflected light and a corresponding standard deviation, and if the standard deviation is below a predetermined level then using a correlation between powers of reflected lights to predict a power of a next light reflected from the object.

* * * * *